(12) United States Patent
Carel

(10) Patent No.: US 9,826,717 B1
(45) Date of Patent: Nov. 28, 2017

(54) DECORATIVE ANIMAL LEASH

(71) Applicant: Scott Carel, Oklahoma City, OK (US)

(72) Inventor: Scott Carel, Oklahoma City, OK (US)

( * ) Notice: Subject to any disclaimer, the term of this patent is extended or adjusted under 35 U.S.C. 154(b) by 0 days.

(21) Appl. No.: 15/019,884

(22) Filed: Feb. 9, 2016

(51) Int. Cl.
*A01K 27/00* (2006.01)

(52) U.S. Cl.
CPC .................. *A01K 27/003* (2013.01)

(58) Field of Classification Search
CPC .... A01K 27/006; A01K 27/001; A01K 27/00; A01K 27/003
USPC ....... 119/858, 769, 770, 791, 792, 654, 795, 119/863, 798, 856, 965; D30/152–154; 362/108; 54/34
See application file for complete search history.

(56) References Cited

U.S. PATENT DOCUMENTS

| | | | | |
|---|---|---|---|---|
| 1,403,956 A * | 1/1922 | Hobson | ............... | A01K 27/001 119/855 |
| 3,213,830 A * | 10/1965 | Wiesemann | ......... | A01K 13/003 119/654 |
| D228,646 S * | 10/1973 | Kissin | ............. | 119/856 |
| 3,765,376 A * | 10/1973 | Higgins | ............... | A01K 27/006 119/654 |
| 3,848,271 A * | 11/1974 | Goele | .............. | A41F 9/002 2/338 |
| D243,411 S * | 2/1977 | Johnson | ............. | D11/3 |
| 4,407,233 A * | 10/1983 | Bozzacco | ............ | A01K 27/006 119/858 |
| 4,491,090 A * | 1/1985 | Almeida | .............. | A01K 27/001 119/856 |
| D317,370 S * | 6/1991 | Skwirz | ............. | D30/152 |
| D359,599 S * | 6/1995 | Archambault | ............ | D30/153 |
| 5,865,148 A * | 2/1999 | Aguirre | ............... | A01K 27/006 119/856 |
| 6,289,903 B1 * | 9/2001 | Haufler | ............... | A01K 27/006 119/857 |
| 6,308,663 B1 * | 10/2001 | Philen | ................. | A01K 27/001 119/863 |
| 6,422,177 B1 * | 7/2002 | Noguero | ............. | A01K 27/006 119/856 |
| 6,748,903 B1 * | 6/2004 | Price, III | ............. | A01K 27/006 119/858 |
| 7,089,719 B2 * | 8/2006 | Owens | ...................... | B68B 1/04 119/858 |
| D544,677 S * | 6/2007 | Wuolu, Jr. | ...................... | D2/627 |
| D649,721 S * | 11/2011 | de Socio | ..................... | D30/152 |
| D716,172 S * | 10/2014 | Howe | ........................... | D11/3 |
| D759,321 S * | 6/2016 | Davis | ............................ | D30/144 |
| 2013/0042819 A1 * | 2/2013 | Ekstrum | .............. | A01K 27/003 119/770 |

* cited by examiner

*Primary Examiner* — Yvonne Abbott-Lewis

(57) ABSTRACT

A decorative animal leash having a plurality of strong wires oriented in a parallel manner, and along each of the wires are strung a plurality of decorative elements, preferably in an organized pattern. A plurality of spacers are also strung along the wires in an interspersed manner to maintain a given spacing between the wires and a given spacing between groups of the decorative elements. Attached to one end of the wires of the animal leash is a clip to be attached to the collar of an animal, and attached to the other end of the wires of the animal leash is a loop to be held by a person.

10 Claims, 4 Drawing Sheets

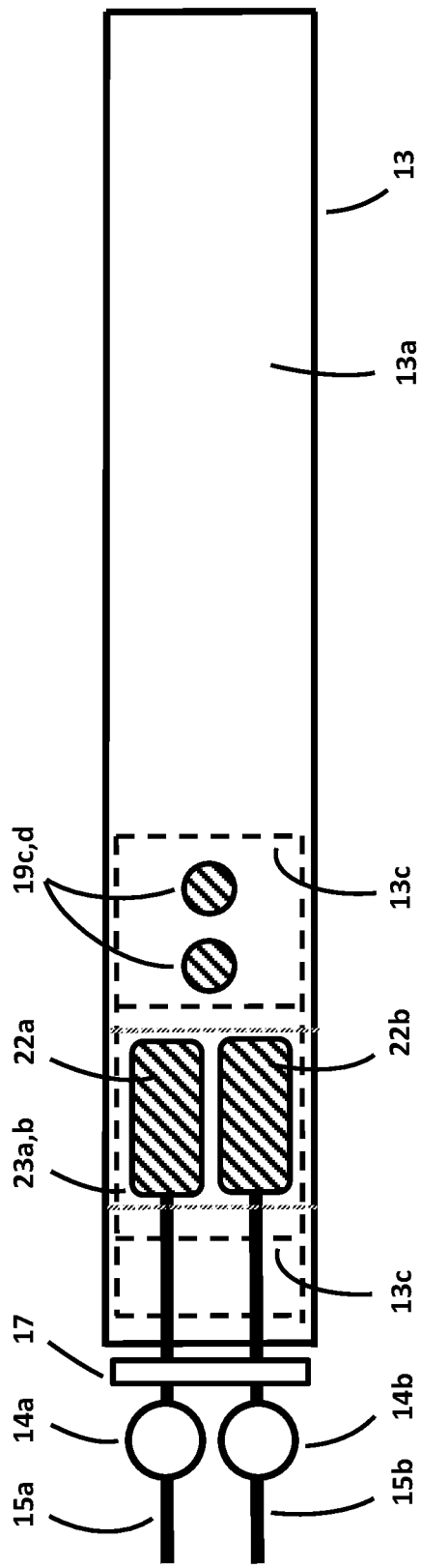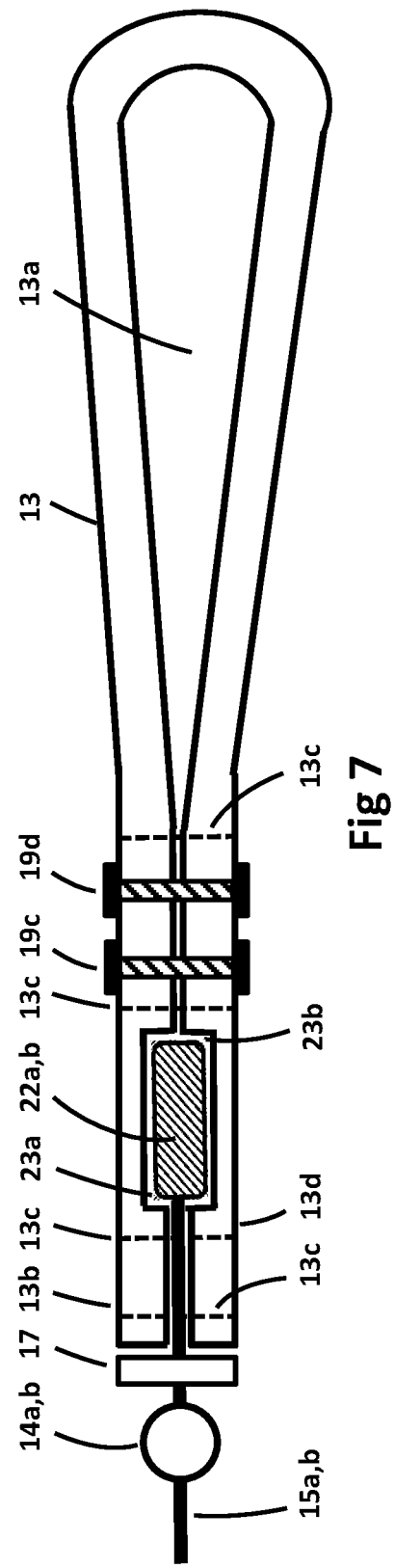

DECORATIVE ANIMAL LEASH

This application claims the benefit of Provisional Application No. 62/117,069, filed Feb. 17, 2015, which is incorporated herein in its entirety by reference.

FIELD OF THE INVENTION

This invention relates to animal leashes, particularly to a strong, decorative, and multiple filament animal leash having as a part thereof a selection of attractive jewelry quality filament-supported ornaments or decorations, including precious and semi-precious stones, strung along the filaments according to the stylishness and preference of the animal owner/handler. The animal leash fulfills the basic animal leash function with an owner/handler being able to exercise control over a domestic animal via the use of the leash detachably attached to a collar on the animal.

BACKGROUND OF THE INVENTION

People who own pets, such as cats and dogs, normally fasten a collar around the neck of the pet to which are attached identification tags, license tags and vaccination tags. To take the animal for a walk a leash is attached to the collar, typically using a clip that is well known in the art. Prior art leashes are normally constructed of leather, wire, rope or chain and may be found in a variety of colors, styles and dimensions. These prior art leashes typically comprise structure based primarily on function rather than ornamentation. However, many pet owners desire to alter the appearance of both their pet leashes and collars, particularly if the pet is a show animal. Often, the owner of an animal wants a decorative collar for their animal and also wants a matching decorative leash. Sometimes pet owners desire to alter the ornamental or decorative appearance of their pet's leash based on their own taste, or on their own personal appearance when they dress up and their pet is to accompany them.

Accordingly, a wide variety of ornamental pet leashes have been designed. Some are of very plain in appearance, some are retractable, some have a fixed ornamental design and others may be altered according to the desires of the owner.

Thus, there is a need in the art for a multi-wire pet leash that has a decorative appearance and the decorative appearance matches the decorative appearance of a collar.

SUMMARY OF THE INVENTION

The aforementioned need in the prior art is fulfilled by the present invention. The invention is a decorative leash that utilizes a plurality of elongated multi-wire filaments, on each of which is strung ornaments or decorations, typically in defined patterns. The plurality of wire filaments of the elongated portion of the decorative leash are held in a spaced, parallel relationship to each other by spacers that are mounted on and spaced along the multi-wire filaments between groups of the ornaments or decorations. The spacers along the elongated multi-wire filaments assure that the ornaments or decorations or maintained in their defined in patterns and the ornaments or decorations assure that the spacers remain in their positions along the multi-wire filaments of the pet leash. This assures that the multi-wire filaments with their ornaments and decorations strung thereon do not become tangled.

In the preferred embodiment of the invention a first end of each of the spaced, parallel multi-wire filaments is attached to a clip end and utilizes an easily operable clip well known in the art, and a second end of the multi-wire filaments is attached to a loop end or handle which is held while walking an animal to which the clip end of the leash is attached to their collar. All the first ends of the multi-wire filaments are attached to the clip end of the leash in a parallel manner, and all the second ends of the multi-wire filaments are attached to the loop end of the leash means in a parallel manner. This assures that the multi-wire filaments do not become tangled near their two ends. This also assures that the force load carried by the leash is equally carried by each of the spaced, parallel multi-wire filaments.

To maintain the spacing of the multiple wires of the novel collar described herein, a plurality of spacers are provided that are spaced along the collar. Each spacer has a plurality of holes there through, one hole for each of the multi-wire filaments and each wire is threaded through one of the holes through each spacer. Thus, if the collar has three multi-wire filaments the spacers each have three holes, and a first of the three multi-wire filaments is threaded through the first hole of each spacer, a second of the three multi-wire filaments is threaded through the second hole of each spacer, and a third of the three multi-wire filaments is threaded through the third hole of each spacer. In this manner the spacing between the three multi-wire filaments is maintained along the length of the leash to assure the decorative appearance of the leash. Threaded on each of the three multi-wire filaments between each two adjacent spacers are groups of beads, gems or ornaments that give the leash it's decorative appearance. The spacers assure that the multi-wire filaments never cross each other and thereby detract from the decorative appearance of the leash. In addition, the uniformly maintained multi-wire filaments spacing assures that the force load carried by the collar is equally carried by each of the spaced, parallel multi-wire filaments. In addition, the groups of beads, gems or ornaments along each of the three multi-wire filaments also maintain the distance between adjacent spacers.

DESCRIPTION OF THE DRAWING

The invention will be better understood upon reading the following Detailed Description in which:

FIG. 6 shows an exploded top view of the leash loop end of the novel, decorative animal leash, showing how it is constructed and showing how a second end of two multi-wire filaments of the elongated portion of the decorative animal leash are attached thereto;

FIG. 7 shows an exploded side view of the leash loop end of the novel, decorative animal leash, showing how it is constructed and showing how a second end of two multi-wire filaments of the elongated portion of the decorative animal leash are attached thereto.

DETAILED DESCRIPTION

Figure 1:
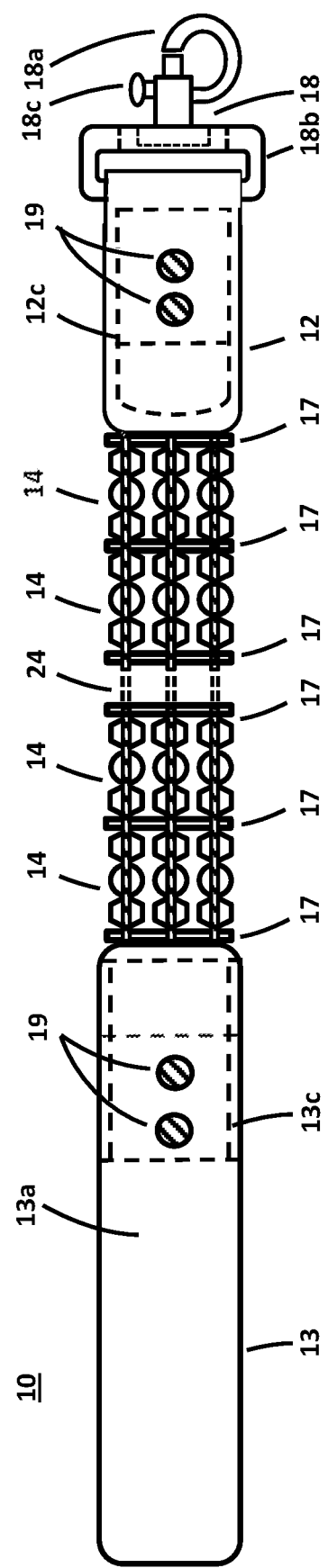
FIG. 1 shows the full length of the novel, decorative animal leash, and showing beads and spacers strung along the three multi-wire filaments.

In FIG. 1 is shown a complete, novel decorative leash 10 in accordance with the teaching of the invention. The leash 10 has a looped handle end 13 and a clip end 12 having a clip 18. The handle and 13 and the clip 18 are interconnected by a length of decorative leash made up of a plurality of sets of gems, beads or decorations 14. The length of decorative leash may be in the order of four feet long and comprises a plurality of multi-wire filaments that are threaded through sets of decorative beads 14 separated by ones of decorative spacers 17 as shown. In the embodiment of the invention shown in FIG. 1 there are three multi-wire filaments that are shown and described in greater detail further herein. There is a gap 24 midway along the length of decorative leash 10 that is used only for the sake of presentation to shorten the overall length of the leash 10 shown in FIG. 1. The three multi-wire filaments are each made of a plurality of finer wires that are twisted together. This makes a thicker wire that is strong but has greater flexibility.

The looped handle end 13 of leash 10 has a loop 13a that is held by hand, in a conventional manner, and is shown in and described in greater detail with reference to FIGS. 2, 6 and 7. The clip end 12 with clip 18 attached thereto is shown in and described in greater detail with reference to FIGS. 3, 4 and 5. Clip 18 is well known in the art and is used widely with leashes and key rings. Looped handle end 13 and clip end 12 are preferably made from leather, but may be made of other materials commonly used to make leashes. The multi-wire filaments, beads 14 and spacers 17 are described in greater detail with reference to FIGS. 2 and 3. The decorative beads 14 may be of many shapes and colors, and mixed in a very wide variety of combinations along the three multi-wire filaments. The beads 14 may also comprise gems or other decorations.

Figure 2:
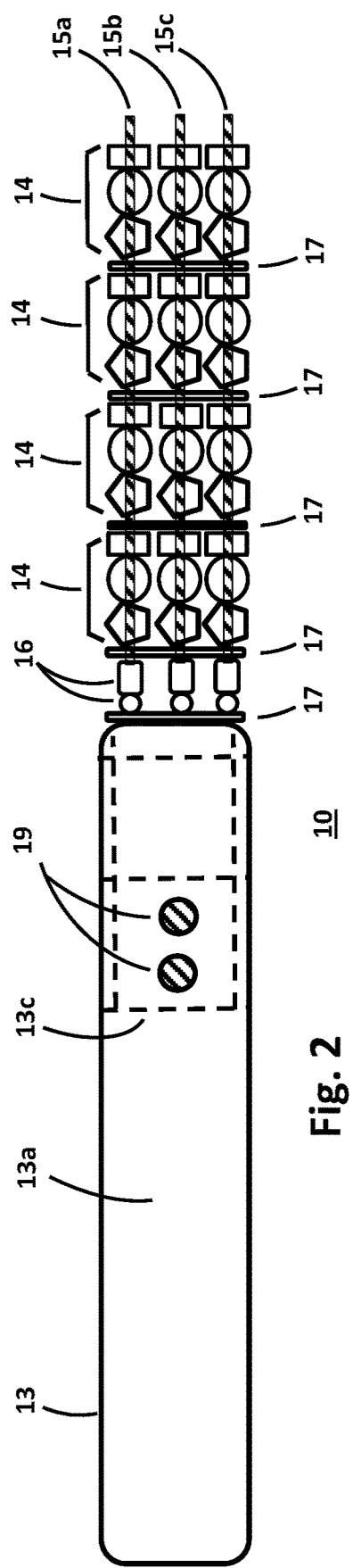
FIG. 2 shows a leash end or handle of the novel, decorative animal leash, and showing beads and spacers strung along three multi-wire filaments.

In FIG. 2 is shown in more detail the leash loop end 13 of leash 10. Looped leash end 13 is preferably made of a single strip of leather or other material that is looped back on itself and the two ends are firmly fastened together by rivets 19 and stitching 13c to create a loop 13a. Sometimes an adhesive (not shown) is used between the two ends of leash loop end 13 that are fastened together by rivets 19 and stitching 13c. With the strip of leather looped back on itself it creates a loop handle 13a that is used to hold leash 10 when it is connected to the collar of an animal. This is better shown in and described with reference to FIGS. 6 and 7.

One end of the multi-wire filaments 15a, 15b, 15c that comprise the middle portion of leash 10 is positioned between the two ends of loop handle end 13 and is firmly retained therein using stitching 13c and rivets 19 as is better shown in and described with reference to FIGS. 6 and 7. As shown in FIG. 2 there are sets of beads, jewels or ornaments 14 strung along each of wire filaments 15a, 15b and 15b along with novel spacers 17. There are holes through the beads 14 and spacers 17 through which the wire filaments 15a, 15b and 15c are threaded. The spacers 17 maintain the distance between wire filaments 15a, 15b and 15c and the sets of beads 14 maintain the distance between spacers 17 along the wire filaments in a cooperative manner. A spacer 17 is positioned adjacent to the closed end of looped handle end 13 to maintain the spacing of wire filaments 15a, 15b and 15c beneath the two layers of looped handle and 13 as shown in FIGS. 6 and 7. Each set of beads, ornaments or jewels 14 comprises items of different shapes and colors that may be selected by the purchaser of collar 10. In FIG. 2 only three beads are shown in each set of beads 14 but the number of beads in each set may be varied. In addition, the color and shape of the beads may be varied and other decorations substituted therefore. While three wire filaments 15a, 15b and 15c are shown in FIGS. 1 through 3, the number of wire filaments may be varied as shown in FIGS. 4 through 7 which show only two wire filaments only for the sake of simplicity.

Figure 3:
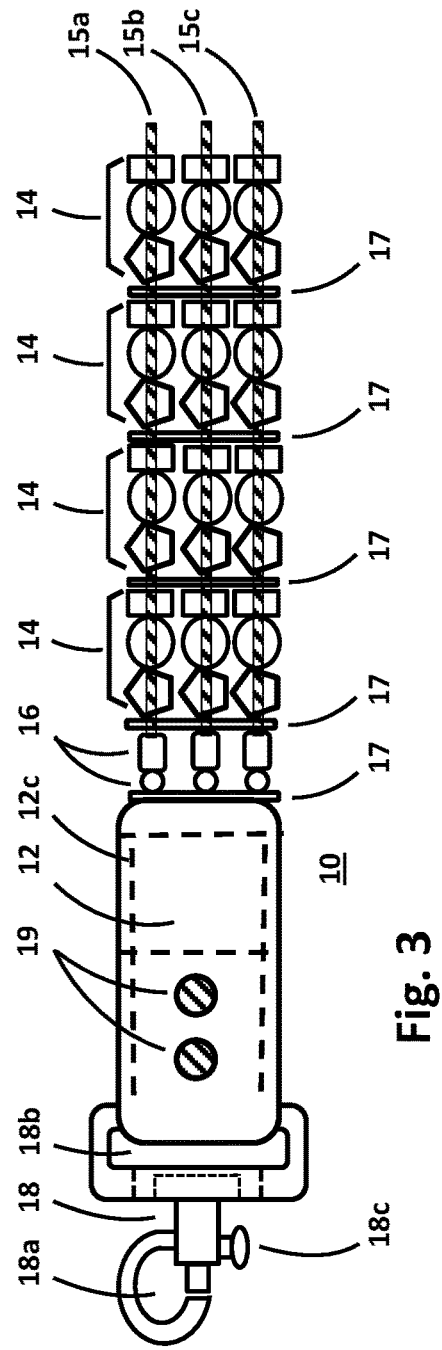
FIG. 3 shows an attachment clip end of the novel, decorative animal leash, and showing beads and spacers strung along three multi-wire filaments.
Figure 4:
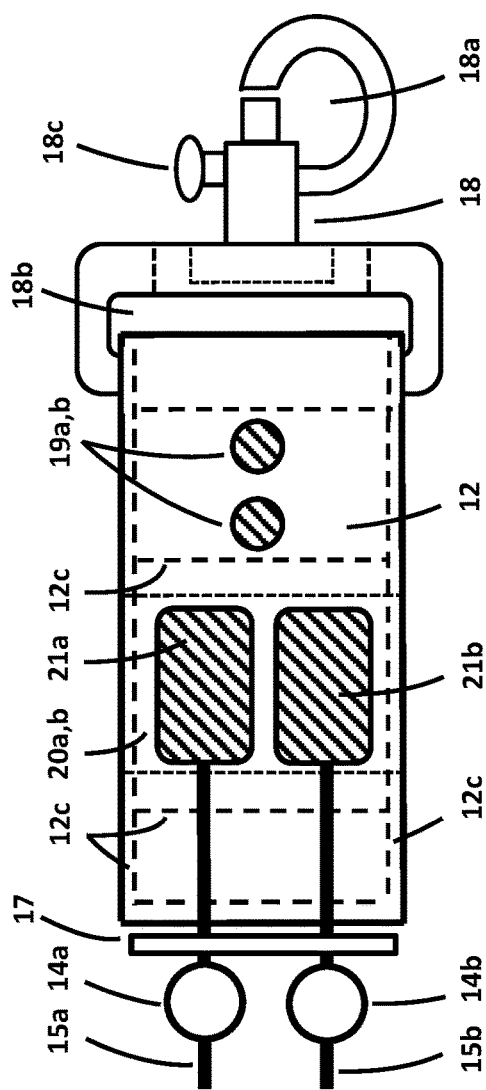
FIG. 4 shows an exploded top view of the attachment clip end of the novel, decorative animal leash, showing how the clip end is constructed and showing how one end of multi-wire filaments of the elongated portion of the decorative animal leash are attached thereto.
Figure 5:
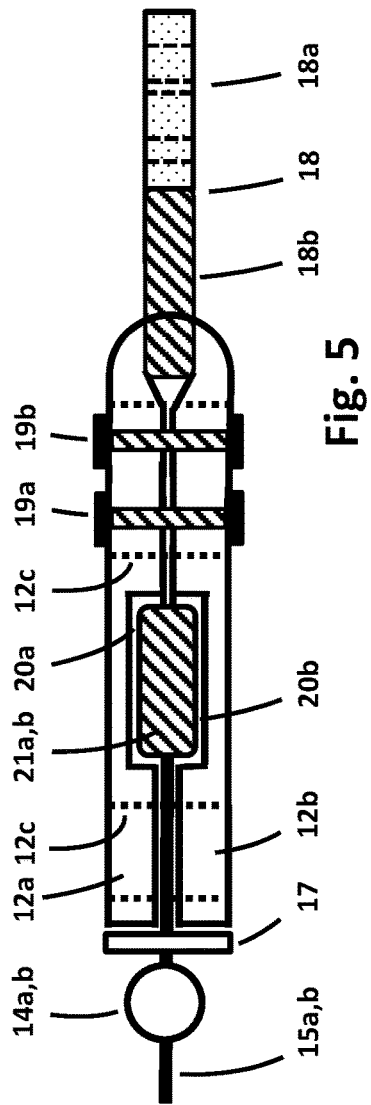
FIG. 5 shows an exploded side view of the attachment clip end of the novel, decorative animal leash, showing how it is constructed and showing how the one end of two multi-wire filaments of the elongated portion of the decorative animal leash are attached thereto.

In FIG. 3 is shown in more detail the clip end 12 with a metal clip 18 of leash 10. The piece of leather used to make clip end 12 is preferably a single strip of leather or other material that is looped back on itself and the two ends are firmly fastened together by rivets 19 and stitching 12c. A spacer 17 is positioned adjacent to the closed end of clip end 12 to maintain the spacing of wire filaments 15a, 15b and 15c beneath the two layers of clip end 12 as shown in FIGS. 4 and 5. An adhesive (not shown) may be used between the looped back pieces of leather in the vicinity between rivets 19 and stitching 12c. The loop created by folding back the piece of leather used to make clip end 12 passes through a loop 18b of clip 18 to firmly hold clip 18 to clip end 12.

The other end of the multi-wire filaments 15a, 15b, 15c comprising the middle portion of leash 10 is positioned between the two ends of the looped back leather of clip end 12 and is firmly retained therein using stitching 12c and rivets 19 as is better shown in and described with reference to FIGS. 4 and 5. As shown in FIG. 3 there are sets of beads, jewels or ornaments 14 strung along each of wire filaments 15a, 15b and 15b along with novel spacers 17. There are holes through the beads 14 and spacers 17 through which the wire filaments 15a, 15b and 15c are threaded. The spacers 17 maintain the distance between wire filaments 15a, 15b and 15c and the sets of beads 14 maintain the distance between spacers 17 along the wire filaments in a cooperative manner. Each set of beads, ornaments or jewels 14 comprises items of different shapes and colors that may be selected by the purchaser of collar 10. In FIG. 3 only three beads are shown in each set of beads 14 but the number of beads in each set may be varied. In addition, the color and shape of the beads may be varied and other decorations substituted therefore. While three wire filaments 15a, 15b and 15c are shown in FIGS. 1 through 3, the number of wire filaments may be varied as shown in FIGS. 4 through 7 which show only two wire filaments for the sake of simplicity.

In FIG. 4 is shown a top view with the greatest detail of clip end 12 with metal clip 18 of leash 10, and it shows how one end of the wire filaments 15a,b with beads 14a,b, and a spacer 17 strung there along are firmly attached to clip end 12. As previously described, clip end 12 is preferably made of a piece of leather that is looped back on itself and the leather loop passes through a loop 18b of metal clip 18. In FIG. 5 is shown a side view with the greatest detail of clip end 12 with metal clip 18 attached Clip 18 is well known in the art and it operates to open an entrance into hole 18a by depressing actuating lever 18c in the direction toward the leather of clip end 12.

The following description is in reference to both FIGS. 4 and 5. Clip end 12 is a piece of leather that is folded back on itself, as shown, creating portions 12a and 12b. In this process the piece of leather is threaded through hole 18b of metal clip 18 and thereby holds clip 18 to the leather of clip end 12. The inner side of the two leather pieces 12a,b (FIG. 5) of the looped back leather piece forming clip end 12 have a shallow groove 20a on one side 12a and 20b on the other side 12b that is best seen in the side view of FIG. 5. When leather pieces 12a,b touch each other the two grooves create a channel, as best seen in FIG. 5, to hold metal crimps 21a,b as now described. To the end of each of wire filaments 15a and 15b, a short distance past wire spacer 17, a crimp element 21a,b is crimped tightly to the end of each of wire filaments 15a and 15b as shown in FIG. 4. Such metal crimps are well known in the art. The metal crimps 21a and 21b are positioned in the channel created by shallow grooves 20a and 20b as shown in FIGS. 4 and 5 just before leather ends 12a and 12b are sandwiched together as shown in FIG. 5, and through leather stitching 12c is applied and rivets 19a,b are mounted through holes through the leather as shown in FIG. 5. This is done to firmly hold leather ends 12a and 12b together even when leash 10 is hooked onto the collar of a large dog who was strongly pulling on leash 10. Spacer 17 assures that wire filaments 15a and 15b remain parallel to each other. As previously mentioned, an adhesive may also be used between the two leather ends of clip end 12 to further strengthen the bond of leather end pieces 12a,b.

While in FIGS. 4 and 5 there is shown a first groove 20a in the end piece 12a of loop end 12, and a second groove 20b in the end piece 12b of loop end 12, as shown in FIG. 5, in an alternative embodiment of the invention only a single groove 20a or 20b may be utilized in which to place crimping elements 21a and 21b. In another embodiment both grooves 20a and 20b may be eliminated, although stitching 12c and rivets 19a,b are still utilize, but there will be a little bulging in the outer surface of end pieces 12a and 12b which will detract from the aesthetic appearance of leash 10.

The following description is in reference to both FIGS. 6 and 7. Looped handle end 13 is a piece of leather that is folded back on itself, as shown, creating end portions 13b and 13d. By folding back the leather on itself the handle loop 13a is created. The inner side of the two leather end pieces 13b,d (FIG. 6) of the folded back leather piece forming looped handle end 13 have a shallow groove 23a in the bottom side 13b, and shallow groove 23b in the top side 13d that is best seen in the side view of FIG. 7. When leather end pieces 13b,d touch each other the two grooves create a channel, as best seen in FIG. 7, to hold metal crimps 22a,b therein as now described.

A metal crimp 22a is firmly crimped onto the end of wire 15a and a metal crimp 22b is firmly crimped onto the end of wire 15b as shown. Such metal crimps are well known in the art. The metal crimps 22a and 22b are positioned in the channel created by shallow grooves 23a and 23b as shown in FIGS. 6 and 7 just before leather ends 13b and 13d are positioned as shown and through leather stitching 13c is applied and rivets 19a,b are mounted through holes through the leather as shown in FIG. 7. As previously mentioned, an adhesive may also be used between the two leather ends of loop handle end 13.

While in FIGS. 6 and 7 there is shown a first groove 23a in the underside of leather end 13b, and a second, opposing groove 23b in the top side of leather end 13b, in an alternative embodiment of the invention only a single groove 23a or 23b may be utilized in which to place crimping elements 22a and 22b. In another embodiment both grooves 23a and 23b may be eliminated, although stitching 13c and rivets 19c,d are still utilize, but there will be a little bulging in the outer surface of end pieces 13b and 13d which will detract from the appearance of leash 10.

Figure 8:
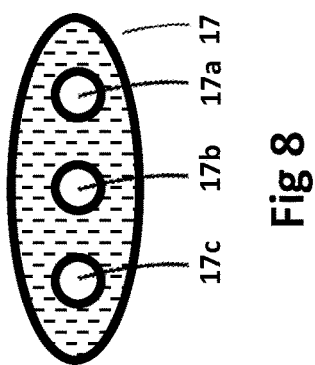
FIG. 8 shows a three hole spacer through which three multi-wire filaments of the leash are threaded.

In FIG. 8 is shown one of the wire spacers 17. Spacer 17 is preferably made of metal, but may be made of plastic or other strong materials, is chrome plated or otherwise colored to give it an aesthetic appearance when assembled into a leash 10. Spacers 17 has an elongated oval shape and three holes 17a-c there through as shown. Spacers 17 are inserted into the elongated, decorative portion of leash 10 as shown in FIGS. 1, 2 and 3. This is done by threading one of wires 15a-c through each of the holes 17a-c as shown in the figures. As previously described, spacers 17 maintain the proper spacing between the three multi-filament wires 15a-c.

while what has been described herein is the preferred embodiment of the invention and two variants thereof, those skilled in the art will understand that numerous changes may be made without departing from the spirit and scope of the invention. For example, a couple of sets of the decorative elements 14 and spacers 17 there between may be replaced by an elongated flat tag on which is the name of the animal with whom the leash 10 will be used. There are holes through the name bearing tag through which the wire filaments 15a-c are threaded to serve the same purpose as the original spacers 17.

The invention claimed is:

1. An animal leash for connecting to a collar around the neck of an animal to provide a means for animal control, the leash comprising:
    a loop handle to be held for controlling an animal to which the leash is attached;
    a fastener means with a manually operable clip connected thereto for attaching the leash to the collar around the neck of the animal;
    a plurality of strong filaments each having a first end and a second end, the first end of each of the plurality of filaments being fastened to the loop handle and the second end of each of the plurality of filaments being fastened to the fastener means;
    a plurality of decorative elements being strung along each of the plurality of filaments; and
    a plurality of spacers each having a plurality of holes there through, where each of the plurality of filaments is fed through one of the holes through each of the plurality of spacers, the spacers being spread along the length of the filaments to maintain a spaced relationship between the plurality of filaments between the loop handle and the fastener means;
    wherein the plurality of decorative elements strung along each of the plurality of filaments are separated into groups by the spacers, and the groups of decorative elements on each of the filaments between the spacers maintain the spacing between the spacers along the plurality of filaments.

2. The animal leash of claim 1 wherein the first end of each of the plurality of filaments attached to the loop handle and the second end of each of the plurality of filaments attached to the fastener mean are attached in a manner to maintain the spaced relationship of the filaments with respect to each other at both the loop handle and the fastener means.

3. The animal leash of claim 2 further comprising a crimping element being securely fastened to the first end of each of the plurality of filaments and to the second end of each of the plurality of filaments, and the crimping elements fastened to the first end of each of the plurality of filaments being used to fasten the first end of the filaments to the loop handle, and the crimping elements fastened to the second end of each of the plurality of filaments being used to fasten the second end of the filaments to the fastener means.

4. The animal leash of claim 3 wherein a first one of the plurality of spacers with the plurality of filaments passing there through is positioned adjacent to the loop handle and a second one of the plurality of spacers with the plurality of filaments passing there through is positioned adjacent to the fastener means, and the two last mentioned spacers maintain the spacing of the filaments right to the loop handle and the fastener means.

5. The animal leash of claim 4 wherein the loop handle comprises a piece of leather having a first end and a second end and the leather is looped back on itself to create a loop that is held by hand to control an animal to which the leash is attached, and the first end and the second end of the leather are sandwiched and fastened firmly together with the crimping elements on the first end of each of the plurality of filaments there between to thereby firmly fasten the first end of the plurality of filaments with crimping elements attached thereto to the loop handle.

6. The animal leash of claim 5 wherein the fastener means with a manually operable clip connected thereto comprises a piece of leather having a first end and a second end and the leather is looped back on itself to create a loop that passes through a slot through the manually operable clip, and the first end and the second end of the leather are sandwiched and fastened firmly together with the crimping elements on the second end of each of the plurality of filaments there between to thereby firmly fasten the second end of the plurality of filaments with crimping elements attached thereto to the leather of the fastener means.

7. The animal leash of claim 6 wherein close to both the first end and the second end of the piece of leather comprising the fastener means there is a groove in the surface of the leather and when the first end and the second end of the leather are sandwiched and fastened firmly together the grooves face each other and create a space in which the crimping elements fastened to the second end of each of the plurality filaments are contained and firmly held.

8. The animal leash of claim 6 wherein close to one of the first end or the second end of the leather comprising the fastener means there is a groove in the surface of the leather and when the first end and the second end of the leather are sandwiched and fastened firmly together the groove creates a space between the first end and the second end of the leather in which the crimping elements fastened to the second end of each of the plurality of filaments are contained and firmly held.

9. The animal leash of claim 5 wherein close to both the first end and the second end of the piece of leather comprising the loop handle there is a groove in the surface of both ends of the leather and when the first end and the second end of the leather are sandwiched and fastened firmly together the grooves face each other and create a space in which the crimping elements fastened to the first end of each of the plurality of filaments are contained and firmly held.

10. The animal leash of claim 9 wherein close to one of the first end or the second end of the leather comprising the loop handle there is a groove in the surface of the leather and when the first end and the second end of the leather are sandwiched and fastened firmly together the groove creates a space between the first end and a second end of the leather in which the crimping elements attached to the first end of each of the plurality of filaments are contained and firmly held.

* * * * *